United States Patent
Komoriya et al.

(10) Patent No.: US 6,450,702 B1
(45) Date of Patent: Sep. 17, 2002

(54) MICRO ACTUATOR HAVING CLAMPING PARTS

(75) Inventors: Hitoshi Komoriya; Yutaka Nakamura; Takao Hirahara, all of Kawasaki (JP)

(73) Assignee: Fujitsu, Limited, Kawasaki (JP)

( * ) Notice: Subject to any disclaimer, the term of this patent is extended or adjusted under 35 U.S.C. 154(b) by 45 days.

(21) Appl. No.: 09/716,331

(22) Filed: Nov. 21, 2000

(30) Foreign Application Priority Data

Nov. 25, 1999 (JP) ............................................. 11-333592

(51) Int. Cl.$^7$ ................................................. G02B 6/36

(52) U.S. Cl. ............................................ 385/90; 385/91

(58) Field of Search ................................ 385/90–91, 52

(56) References Cited

U.S. PATENT DOCUMENTS 6,164,837 A * 12/2000 Haake et al. .................. 385/90

OTHER PUBLICATIONS

"MEMS–Based Integrated Head/Actuator/Slider for Hard Disk Drives" IEEE/ASME Transactions on Mechatronics, vol. 3, No. 3, Sep., 1998.

* cited by examiner

Primary Examiner—John D. Lee
Assistant Examiner—Jerry T. Rahll
(74) Attorney, Agent, or Firm—Armstrong, Westerman & Hattori, LLP (57) ABSTRACT

There is provided a micro actuator displacing a micro portion by use of an electrostatic force, the micro actuator comprising a first stationary part; a displacement part spaced apart from the first stationary part by a predetermined distance in a confronting manner, the displacememt part being displaceable relative to the first stationary part; a second stationary part; the lock parts being displaceable relative to the second stationary part; wherein the displacement part is displaced by application of a voltage between the first stationary part and the displacement part, the lock parts being displaced by application of a voltage between the second stationary part and the lock parts, and wherein the lock parts clamp the displacement part with no voltage applied, the lock parts releasing the displacement part with a voltage applied.

5 Claims, 9 Drawing Sheets

FIG. 1A
No voltage is applied

FIG. 1B
A voltage is applied

Plan view      Cross sectional view

Plan view　　　　Cross sectional view

PLAN VIEW　　　CROSS SECTIONAL VIEW

ADJUSTMENT DIRECTION

FIG. 8

Adjustment Direction

MICRO ACTUATOR HAVING CLAMPING PARTS

BACKGROUND OF THE INVENTION

1. Field of the Invention

The present invention relates generally to a micro actuator having an electrostatically driven micro portion, and more particularly, to a micro actuator having a novel structure which includes clamping parts to enable the micro portion to be fixed at any position.

2. Description of the Related Art

A micro actuator comprises a stationary part and a displacement part which are disposed in close proximity to each other on a silicon substrate. A voltage is applied between the stationary part and the displacement part to generate an attractive force (electrostatic force) due to positive and negative static electricities occurring therebetween, thereby causing the displacement part to be displaced. As a result of formation of a minute displacement part on the silicon substrate by use of the IC fabrication process, the micro actuator as a micro machine is able to displace the displacement part in the form of a micro portion by a minute distance.

Such a micro machine is often called a micro electro/mechanical system (abbreviated as MEMS) in recent years, of which applications are proposed to various fields including a field requiring an especially precise positioning accuracy and including an apparatus such as a precision machine having a restricted accommodation space for a positioning mechanism.

The conventional micro actuator forms confronting faces of the stationary part and the displacement part which are spaced apart from each other by a minute distance, and a voltage is applied therebetween to cause a negative potential on one hand and a positive potential on the other, thereby generating an electrostatically attractive force (electrostatic force) to drive the displacement part. A variety of applications are presently conceived by making use of the drive of this displacement part.

The hitherto proposed micro actuator however merely displaces the displacement part by a predetermined distance. It may be effective for the example of application utilizing the minute distance displacement of the displacement part. However, there is a need to continue to apply the displacement voltage in order to positionally keep the displacement part.

Utilization for application has not substantially been effected so far, such as for example displacing the position of the displacement part by a predetermine distance and thereafter fixing it at that position.

SUMMARY OF THE INVENTION

It is therefore an object of the present invention to provide a novel structure of a micro actuator capable of keeping the position of the displacement part.

Another object of the present invention is to provide a micro actuator capable of displacing the displacement part to any direction and also keeping the position thereof.

In order to attain the above objects, according to an aspect of the present invention, there is provided a micro actuator displacing a micro portion by use of an electrostatic force, the micro actuator comprising a first stationary part; a displacement part spaced apart from the first stationary part by a predetermined distance in a confronting manner, the displacement part associated with the first stationary part by way of a first support, the displacement part being displaceable relative to the first stationary part; a second stationary part; and lock parts spaced apart from the second stationary part by a predetermined distance in a confronting manner, the lock parts associated with the second stationary part by way of a second support the lockparts being displaceable relative to the second stationary part; wherein the displacement part is displaced by application of a voltage between the first stationary part and the displacement part, the lock parts being displaced by application of a voltage between the second stationary part and the lock parts, and wherein the lock parts clamp the displacement part with no voltage applied, the lock parts releasing the displacement part with a voltage applied.

According to the above aspect, a second voltage is applied between the lock parts and the second stationary part to render the displacement part displaceable so that the position of the displacement part is displaced depending on a first voltage. Application of the second voltage is then halted to allow the lock parts to clamp the displacement part, after which application of the first voltage is halted. Therefore, the displacement part is displaced to a desired position where the displacement part can securely be fixed without subsequent application of any voltage.

DESCRIPTION OF THE PREFERRED EMBODIMENTS

The present invention will now be described with reference to the accompanying drawings which illustrate presently preferred embodiments thereof. It will however be understood that such embodiments are not intended to limit the technical scope of the present invention.

Figure 1A:
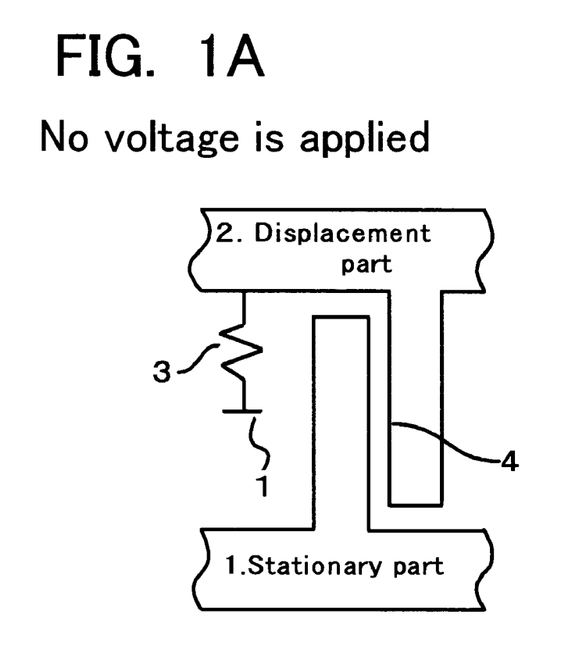
FIGS. 1A and 1B illustrate a principle of a micro actuator of an embodiment.
Figure 1B:
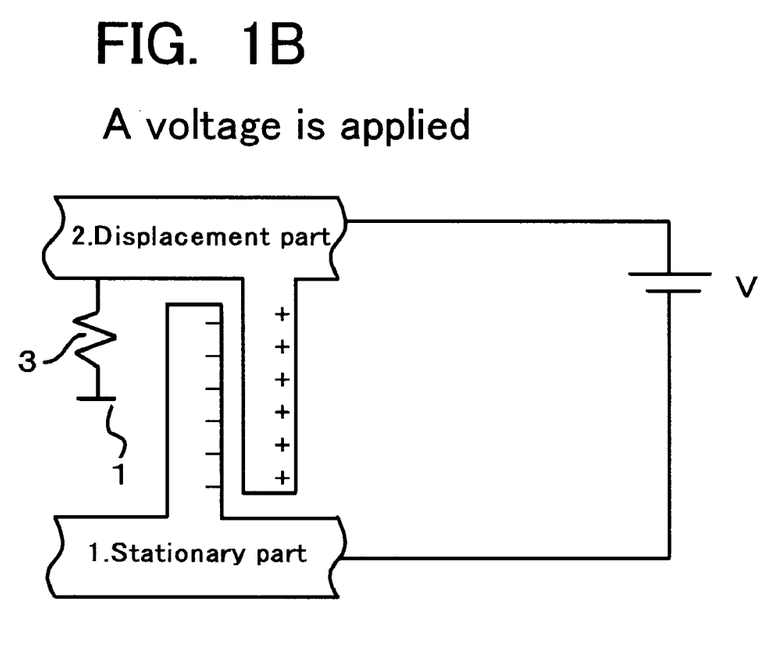

FIGS. 1A and B are diagrams for explaining the principle of a micro actuator. The micro actuator of this application comprises a stationary part 1 formed on, e.g., a substrate not shown, and a displacement part 2 spaced apart from the stationary part 1 by a predetermined distance 4. The displacement part 2 is attached via a support 3 to the stationary part 1. The support 3 is a part having a resilience for example such that the displacement part 2 can be displaced relative to the stationary part 1. The stationary part 1 and the displacement part 2 are made of, e.g., a material having an electrical conductivity such as silicon.

FIG. 1A shows the state where no voltage is applied between the stationary part 1 and the displacement part 2. In this state, the displacement part 2 is retained at a position spaced apart from the stationary part 1 by the distance 4. FIG. 1B shows the state where a voltage is applied between the stationary part 1 and the displacement part 2. As a result of application of voltage, the displacement part 2 side is charged with positive static electricity and the stationary part 1 side is charged with negative static electricity. Due to an attraction (electrostatic force) by the thus charged static electricity, the displacement part 2 is displaced by a minute distance toward the stationary part 1.

The electro static force F is given as $F=KV^2/r^2$ which means that the electrostatic force is proportional to the square of the applied voltage V and is inversely proportional to the square of the distance r between the displacement part 2 and the stationary part 1. Herein, K denotes a constant. Thus, depending on the distance r and the voltage V, it is possible to regulate the electrostatic force F and therefore to indirectly adjust the position of the displacement part 2. This is the principle of operation of the micro actuator.

Figures 2A, 2B, 2C:
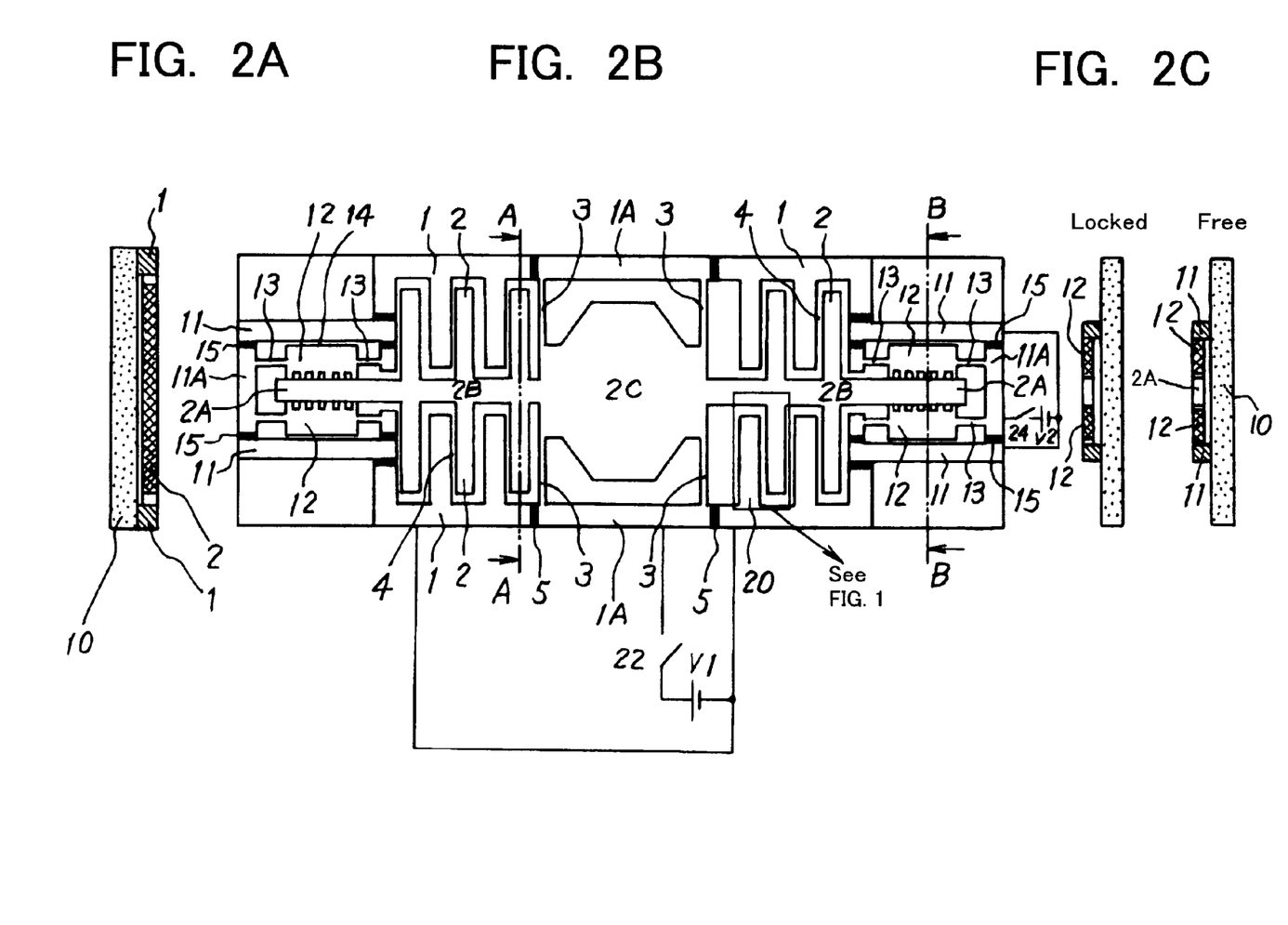
FIGS. 2A to 2C illustrate a configuration of a micro actuator in accordance with a first embodiment.

FIGS. 2A to 2C are configuration diagrams of the micro actuator in accordance with a first embodiment. With respect to a top plan view of FIG. 2B, FIG. 2A is a sectional view taken along a line A—A, and FIG. 2C is a sectional view taken along a line B—B. As is apparent from FIG. 2B, the micro actuator shown herein is laterally and vertically symmetrical and comprises on a silicon substrate 10, a first stationary part 1 and a displacement part 2 associated therewith, and a second stationary part 11 and a lock part 12 associated therewith.

The displacement part 2 includes a substantially octagonal central part 2C, comb-teeth shaped drive parts 2B disposed on both sides of the central part 2C, and extremities 2A disposed outside of the drive part s 2B. By way of four resilient supports 3, the displacement part 2 is provided on the stationary part 1 and a stationary part 1A that are arranged along the peripheries of the substrate 10. As shown in the A—A sectional view of FIG. 1A, the stationary parts 1 and 1A are layers formed fixedly on the silicon substrate 10, although the resilient support 3 and the displacement part 2 are formed spatially apart from the silicon substrate 10 by a certain distance and are able to displace in the lateral direction.

The stationary part 1 also has a shape conforming to the comb-shape of the drive part 2B of the displacement part 2, with the comb-shaped surface of the displacement part 2 being spaced apart from the surface of the stationary part 1 by a minute distance 4. As shown, the left-side comb-teeth surface of the displacement part 2 confronts the surface of the stationary part 1 with the minute distance 4 therebetween, and the right-side comb-teeth surface confronts the surface of the stationary part 1 with a longer distance than the distance 4 therebetween. The relationship between the displacement part 2 and the stationary part 1 in a region 20 is as shown in FIGS. 1A and 1B.

The resilient support 3 for providing a support for the displacement part 2 is a spring member extending from the stationary part 1A that is provided to the stationary part 1 via the insulating part 5. Thus, by closing the switch 22 to apply a voltage V1 between the displacement part 2 and the stationary part 1, an electrostatic force is generated between the comb teeth of the drive part 2B and the confronting surface of the stationary part 1 so that the drive part 2B is driven leftward in the diagram. As a result, the displacement part central part 3C serving as a stage is also driven leftward. Shaping the drive part 2B like comb teeth enables a greater electrostatic force to be generated. It will be appreciated that the shown micro actuator is vertically symmetrical so that the voltage V1 can similarly be applied between the upper stationary part 1 and the displacement part 2.

As described above, the electrostatic force is in inverse proportion to the square of the distance between the displacement part and the stationary part. Hence, if the distance 4 is e.g., 2 $\mu$m between the stationary part 1 and the left side of the comb teeth of the drive part 2B, with the distance for the right side being e.g., 10 $\mu$m, then the leftward electrostatic force will become approx. 25 times the rightward electrostatic force, whereupon the drive part 2B is displaced leftward.

The extremities 2A are arranged on both sides of the displacement part 2. These extremities are also displaced leftward by the electrostatic force generated in the drive part 2B. Above and below the extremities 2A, the lock parts 12 are provided for clamping the extremities 2A. The lock parts 12 are spaced apart from the second stationary part 11 by a minute distance 14 and are connected via a resilient support 13 to a stationary part 11A. The lock parts 12 and the second stationary part 11 are electrically insulated from each other by an insulating part 15.

The second stationary part 11 is spaced apart from the lock parts 12 by the minute distance 14 so that the lock parts 12 above and below the extremities 2A are displaced vertically by the application of a voltage V2 between the two as a result of closing of the switch 24. This displacement releases the extremities 2A from the clamped state presented by the lock part 12 so that the extremities 2A are allowed to displace laterally. Thus, by opening the switch 24 to halt the application of the voltage V2, the four lock parts 12 clamp the right and left extremities 2A from above and below to fix the position of the displacement part 2. That is, the displacement part 2 is fixed in position with no voltage applied.

FIG. 2C shows the sections of the lock part in its locked state and in its free state. As discussed herein above, in the locked state where no voltage V2 is applied thereto, the upper and lower lock parts 12 clamp the extremity 2A of the displacement part 2, whereas in the free state where the voltage V2 is applied thereto, the upper and lower lock parts 12 are attracted toward the outside second stationary part 11 by the electrostatic force, releasing the extremities 2A from its clamped state.

Description will then be made of a method of regulating the position of the displacement part 2 of the micro actuator. The switches 22 and 24 are initially in their off state. With the switch 24 off, no voltage V2 is applied between the second stationary part 11 and the lock parts 12, so that there is no electrostatic force attracting each other therebetween. Accordingly, the lock parts 12 come into contact with the extremities 2A of the displacement part 2 so as to clamp them from above and below, to fix the displacement part 2 in a position. Then, turning on the switch 24 for the application of the voltage V2 allows electrostatic force attracting each other to occur between the second stationary part 11 and the lock part 12, with the result that the lock part 12 comes apart from the extremities 2A of the displacement part 2 so that the displacement part 2 can be displaced by a minute distance. Thus, turning on the switch 22 for the application of the voltage V1 between the first stationary part 1 and the displacement part 2 allows an electrostatic force attracting each other to be generated therebetween, whereupon the displacement part 2 is displaced leftward by a minute distance. This distance of displacement can be regulated by the applied voltage value. This means that the position of the displacement part 2 can be controlled by the applied voltage V1. After the adjustment of the lateral position of the displacement part 2, the switch 24 is turned off so that the lock parts 12 clamp the extremities 2A of the displacement part 2 from above and below to fix the lateral position of the displacement part 2. Afterward, the switch 22 is turned off to halt the application of the voltage V1. Due to the clamping of the extremities 2A by the lock parts 12, in spite of the halt of the voltage V1, the displacement part 2 remains fixed in its lateral position. It becomes thus possible to adjust the position of the displacement part 2 by the application of voltage and to fix the displacement part 2 at that position without any application of voltage.

Figure 3A:
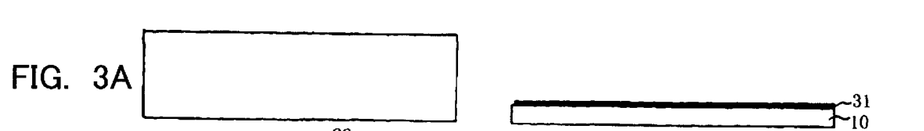
FIGS. 3A to 3F illustrate a manufacturing process of the micro actuator of FIG. 2.
Figure 3B:
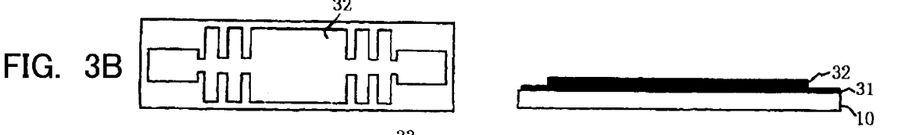
Figure 3C:
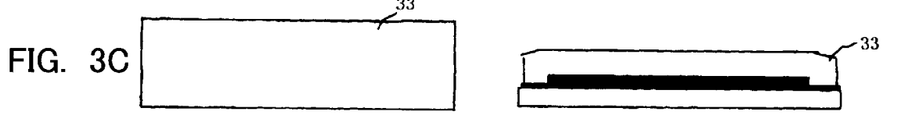

FIGS. 3A to 3E show the steps of manufacturing the micro actuator of FIGS. 2A to 2C, each bearing a schematic top plan view on the left cross sectional view thereof on the right, respectively. As shown in FIG. 3A, the surface of the silicon substrate 10 is oxidized to form an insulating film 31 made of silicon dioxide thereon. Then, as shown in FIG. 3B, a sacrifice layer 32 is formed at a site where the displacement part is formed. The sacrifice layer 32 is thereafter removed to render the displacement part partially apart from the substrate 10. The sacrifice layer 32 is made of a material such as PSG for example, capable of selective etching with the silicon dioxide film 31. Then, as shown in FIG. 3C, a structure layer 33 is formed on top of the entire surface of the substrate 10. The structure layer 33 is made of a material having an electrical conductivity such as polysilicon or metal for example, since it thereafter forms the stationary parts 1 and 11, the displacement part 2 and so forth.

Figure 3D:
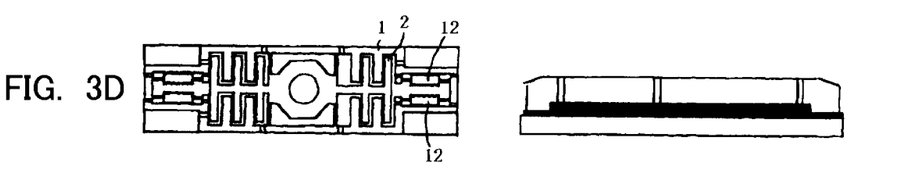
Figure 3E:
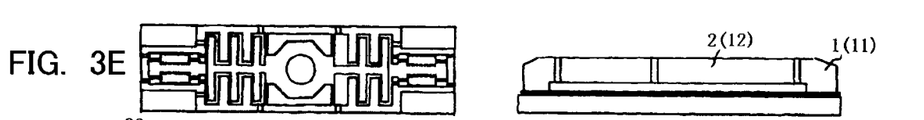
Figure 3F:
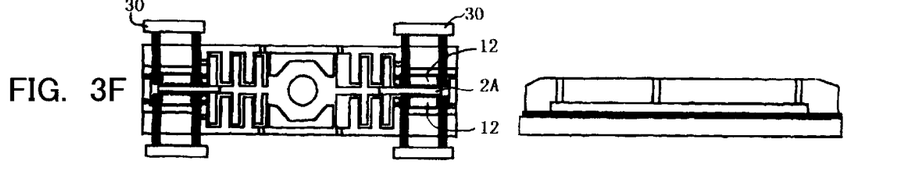

Then, as shown in FIG. 3D, the structure layer 33 is patterned into geometries of the displacement part 2 and the stationary parts 1 and 11 by use of ordinary lithography technique. At this point of time, the extremities 2A on both sides of the displacement part 2 are not formed, but the lock parts 12 clamping the displacement part 2 therebetween is formed. Afterward, as shown in FIG. 3E, the PSG sacrifice layer 33 is removed by etching, with the result that the displacement part 2 and the lock parts 12 become partially apart from the substrate 10, and thus displaceable relative to the stationary parts 1 and 11. Then, finally, a predetermined jig 34 is used to vertically expand the lock parts 12, whilst the extremities 2A are attached to both sides of the displacement part 2 by means of anode junction or adhesive. After attachment, the jig 34 is removed to allow the lock parts 12 to vertically clamp the extremities 2A. The above is the process of manufacturing the micro actuator of FIGS. 2A to 2C.

FIGS. 4A to 4D show a configuration of a micro actuator in accordance with a second embodiment. Identical reference numerals are given to the same parts as those of the micro actuator shown in FIGS. 2A to 2C. Note that the applied voltage is excluded from FIGS. 4A to 4D.

In addition to the first stationary part 1, the displacement part 2, the second stationary part 11 and the lock parts 12, the micro actuator of the second embodiment comprises on the silicon substrate 10 an upper stationary part 41 which is a third stationary part allowing a vertical displacement of the displacement part 2. The upper stationary part 41 is in the form of a polysilicon film or a metal film which is formed via an insulating film 45 on top of the first stationary part 1 formed on the upper and lower ends of the substrate 10.

A voltage is applied between the upper stationary part 41 and the displacement part 2 whereby an attracting electrostatic force is generated therebetween, enabling the displacement part 2 to displace in the direction away from the substrate 10. It is thus possible to adjust the lateral position of the displacement part 2 relative to the first stationary part 1 and to adjust the vertical position thereof relative to the third stationary part 41. The position of the stage part 2C can therefore freely be adjusted in a vertical and lateral, two-dimensional space.

Figure 4A:
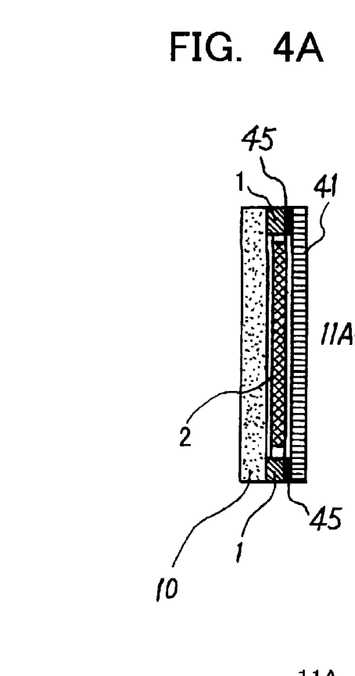
FIGS. 4A to 4D are configuration diagrams of a micro actuator in accordance with a second embodiment.
Figure 4B:
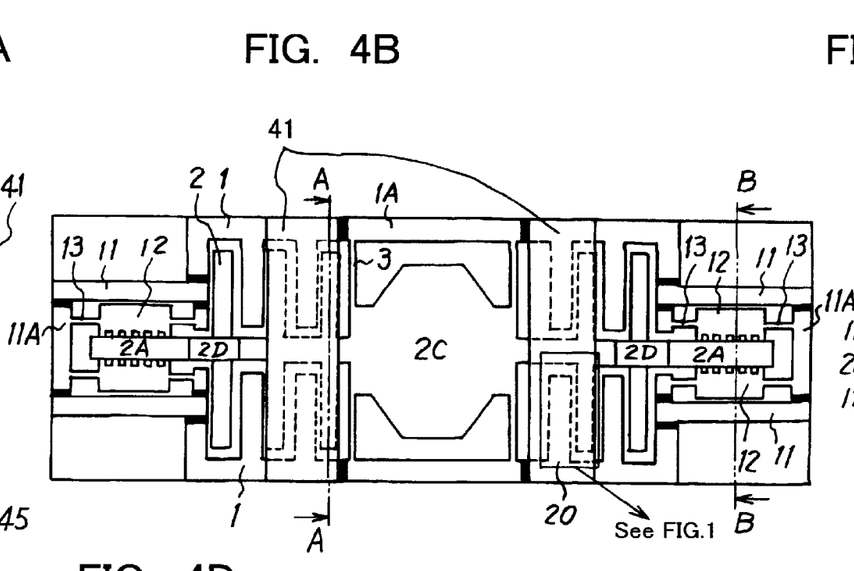
Figure 4C:
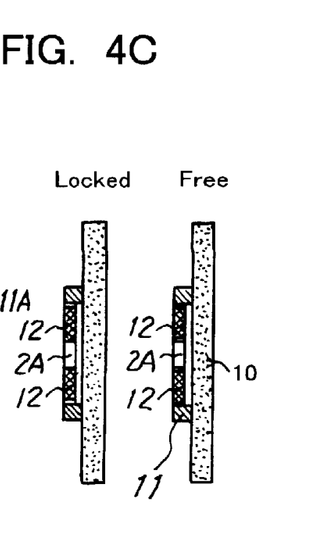

FIG. 4A is a cross sectional view taken along a line A—A of the top plan view. As seen in this cross sectional view, the upper stationary part 41 is provided on the first stationary part 1 by way of the insulating layer 45. The upper stationary part 41 is formed in close proximity to the top surface of the displacement part 2. Thus, application of voltage between the upper stationary part 41 and the displacement part 2 enables the displacement part 2 to displace upward.

Figure 4D:
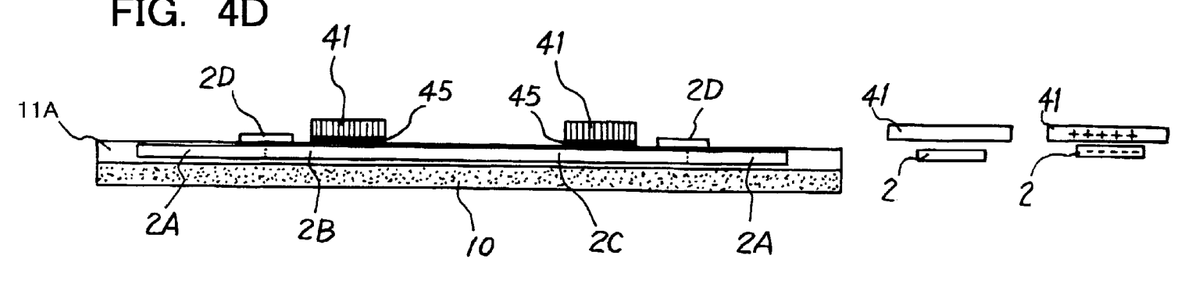
Figure 5A:
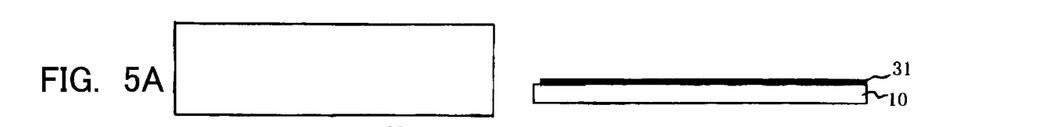
FIGS. 5A to 5F are manufacturing process diagrams of the micro actuator o FIG. 4.
Figure 5B:
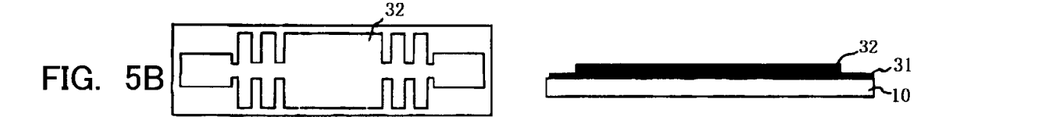
Figure 5C:
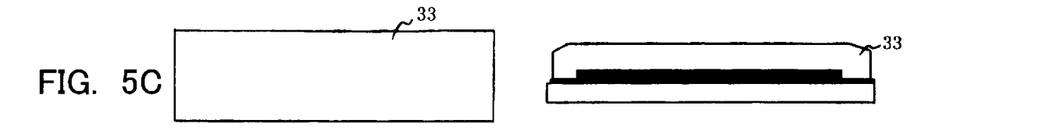
Figure 5D:
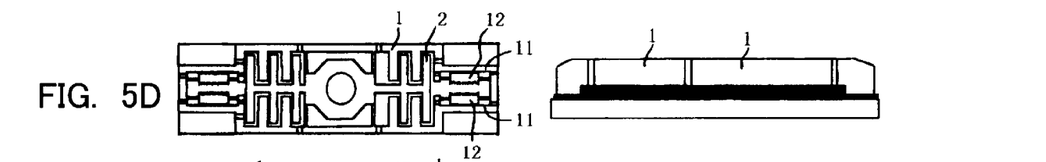
Figure 5E:
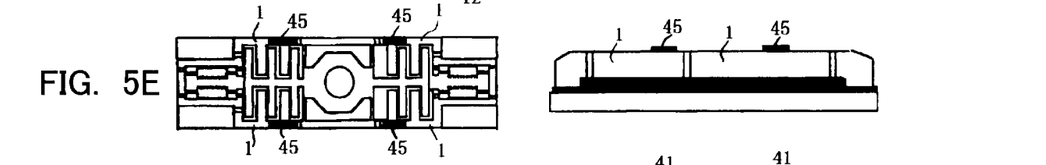
Figure 5F:
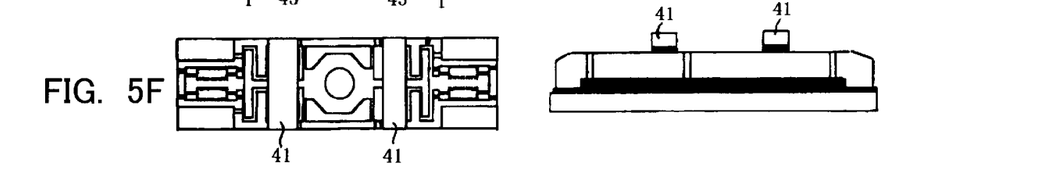

FIG. 4D is a cross sectional view taken along a plane laterally intersecting substantially the center of the top planview. The extremities 2A on both sides of the displacement part 2 is formed to be stepped shape with a raised part 2D, and the stepped portion is jointed to the displacement part 2.

FIGS. 5A to 5F and FIGS. 6A and 6B illustrate steps of manufacturing the micro actuator of FIGS. 4A to 4D. Each step is shown by a cross sectional view on the right and by a top plan view on the left. The steps of FIGS. 5A to 5D are the same as those of FIGS. 3A to 3D. In case of FIGS. 5A to 5F, after the step D the insulating film 45 is formed on top of the first stationary part 1 as in FIG. 5E, and then the upper stationary part 41 in the form of a silicon piece is anode joined onto the insulating film 45 as in FIG. 5F. khus, the upper stationary part 41 and the displacement part 2 confront each other with a space therebetween.

Figure 6A:
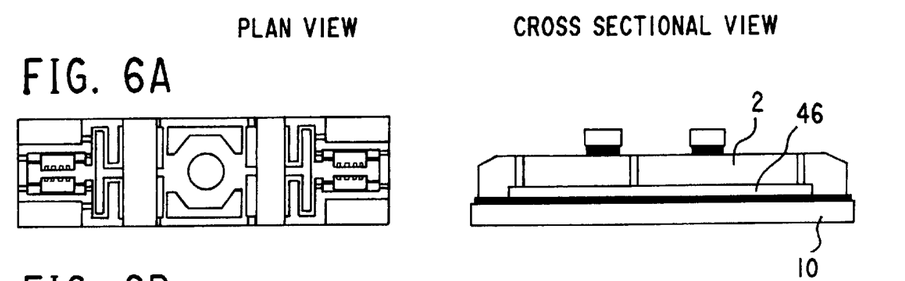
FIGS. 6A and 6B are manufacturing process diagrams of the micro actuator of FIG. 4.
Figure 6B:
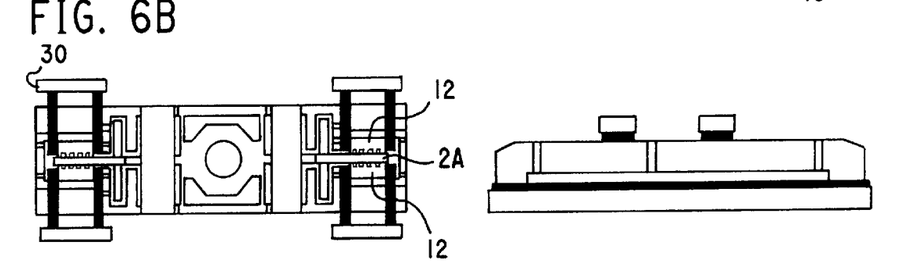

The sacrifice layer 32 is then dissolved for removal by etching liquid in FIG. 6A, allowing the displacement part 2 to become spaced apart from the substrate 10. Then, finally, as shown in FIG. 6B the lock parts 12 are vertically opened by a jig 30, and the extremities 2A are anode joined to both ends of the displacement part 2 so that the extremities 2A are affixed between the lock parts 12. Then, the removal of the jig 30 allows the lock parts 12 to clamp the extremities 2A.

In the position adjusting operation of the displacement part of the micro actuator of the second embodiment, similar to the first embodiment, a voltage is first applied between the second stationary part 11 and the lock parts 12 so that the clamping state of the lock parts 12 is released to render the displacement part 2 displaceable. A predetermined voltage is then applied between the first stationary part 1 and the displacement part 2 to generate an electrostatic force depending on the voltage value so that the displacement part 2 is displaced by a predetermined distance in the direction parallel to the substrate 10. A voltage is further applied between the upper stationary part (third stationary part) 41 and the displacement part 2 to generate an electrostatic force depending on the voltage value so that the displacement part 2 is displaced by a predetermined distance in the direction orthogonal to the substrate 10. After such a displacement of the displacement part 2 to the desired position, the application of voltage between the lock parts 12 and the second stationary part 1 is halted to allow the lock parts 12 to clamp the extremities 2A of the displacement part. Afterward, turned off are the voltage between the first stationary part 1 and the displacement part 2 and the voltage between the third stationary part 41 and the displacement part 2. As a result, it is possible to fix the displacement part 2 at a desired position without any application of voltage.

Various examples of application of the above micro actuator would be conceivable. The examples of application will hereinafter be described which include an example of application to the positioning of lenses utilized for the optical coupling between optical elements of an optical module and which include an example of application to the positioning for optical coupling between the optical head fiber and the head for optical disk or magneto-optical disk.

Figure 7:
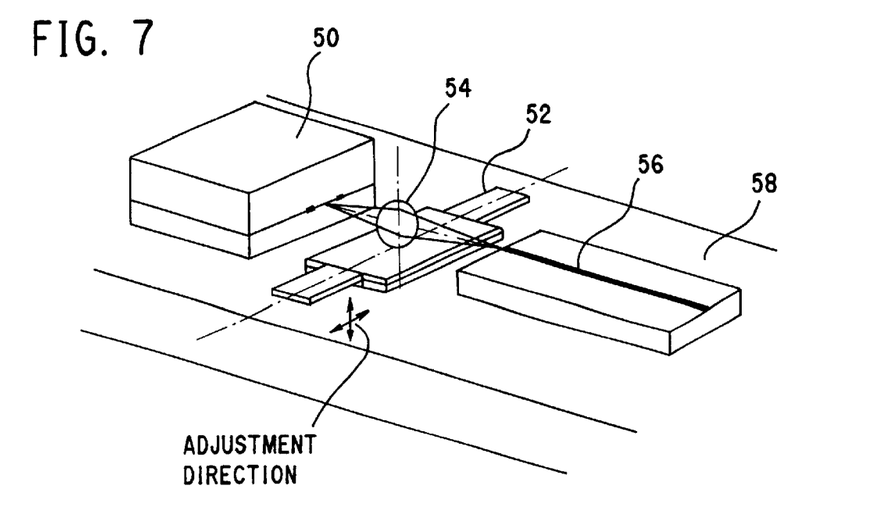
FIG. 7 is a perspective view showing by way of example an optical module having a self-adapting MEMS (micro electro/mechanical system) interposed between a laser diode and an optical waveguide.

FIG. 7 is a perspective view showing an example of an optical module having a self-adapting MEMS (micro electro/mechanical system) shown in the second embodiment, interposed between a laser diode and an optical waveguide. A chip of the laser diode designated at 50 is intactly mounted on a silicon substrate 58, and a chip of the optical waveguide designated at 56 is intactly mounted in such a manner as to confront a laser light emitting part of the laser diode 50. The self-adapting MEMS 52 is mounted therebetween, with a micro lens 54 being disposed on the central stage 2C of the displacement part.

As described herein above, the self-adapting MEMS 52 allows a minute positional displacement of the micro lens 54 in lateral and vertical directions through the application of voltage. The self-adapting MEMS 52 makes adjustment of position of the micro lens 54 such that the optical axis of the laser light emitted from the laser diode 50 is coincident with the optical axis of the optical waveguide 56. After the positional adjustment, the application of voltage to the lock parts is halted so that the displacement part is clamped to fix the position of the micro lens 54.

Utilization of the self-adapting MEMS enables the positional accuracy upon the bonding of the laser diode 50 to be loosened from submicron to several microns, thus making it possible to loosen the positioning accuracy for a bonding apparatus. In the event that upon the bonding, other means assure the vertical position relative to the silicon substrate 58, the self-adapting MEMS of the first embodiment capable of only the horizontal positional adjustment could be utilized. In such an event, the micro lens is replaced by a micro mirror, a prism, a glass plate, etc., to adjust the optical axis direction in a single direction.

Figure 8:
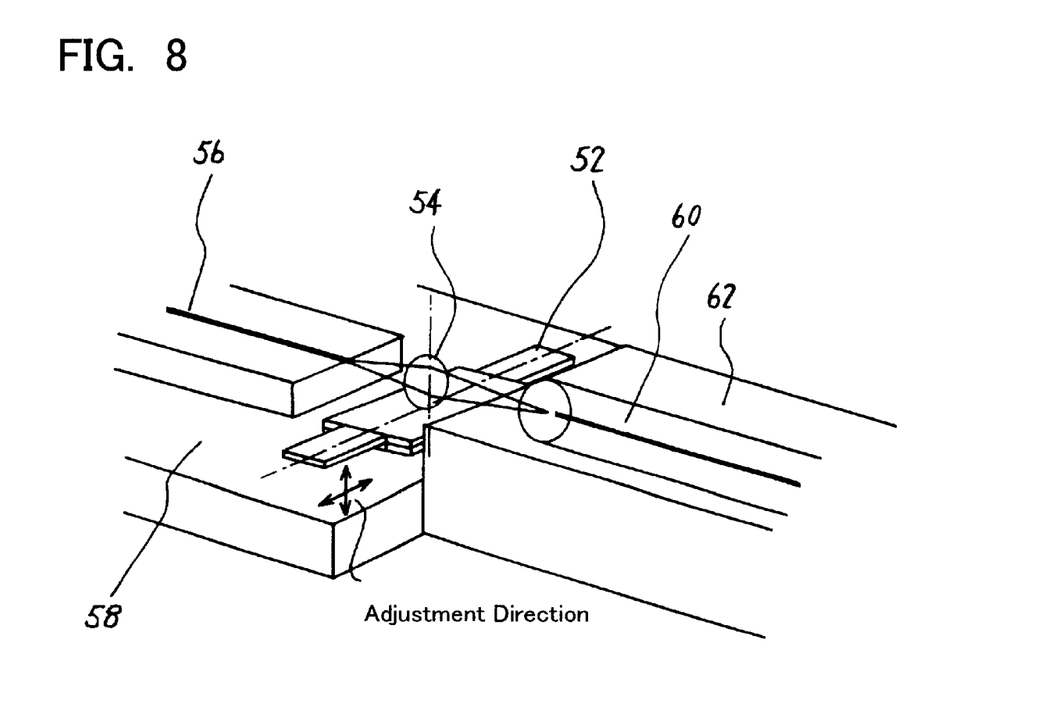
FIG. 8 is a perspective view of the optical module utilizing the self-adapting MEMS for optical axis alignment with the optical module and an optical component such as an optical fiber.

FIG. 8 is a perspective view of an optical module making use of the self-adapting MEMS for the optical axis alignment between the optical module as of FIG. 7 and the optical element such as an optical fiber. The silicon substrate 58 carries the optical waveguide 56 thereon. The terminal end of the optical waveguide 56 is provided with the self-adapting MEMS 52 on top of which the micro lens 54 is mounted. An optical fiber 60 containing connector 62 is coupled to the terminal end of the optical waveguide 56 of the optical module. In such a case, even though the coupling accuracy of the connector 62 is loose, utilization of the position adjusting feature of the self-adapting MEMS 52 enables the optical axis alignment between the optical waveguide 56 and the optical fiber 60 to easily be made with a high accuracy.

It is possible to easily make this optical axis alignment by monitoring the quantity of light from the optical fiber 60 to detect the position acquiring the maximum quantity of light while allowing a horizontal and vertical displacement of the displacement part 2 of the self-adapting MEMS 52 with the application of voltage. Thus, one-touch coupling with a less mounting accuracy becomes feasible for the fiber connector 62.

In cases where the above optical axis alignment is required among the light-emitting element, light-receiving element, optical fiber, optical waveguide, etc., the position adjustment feature of this micro actuator can be utilized.

Figure 9A:
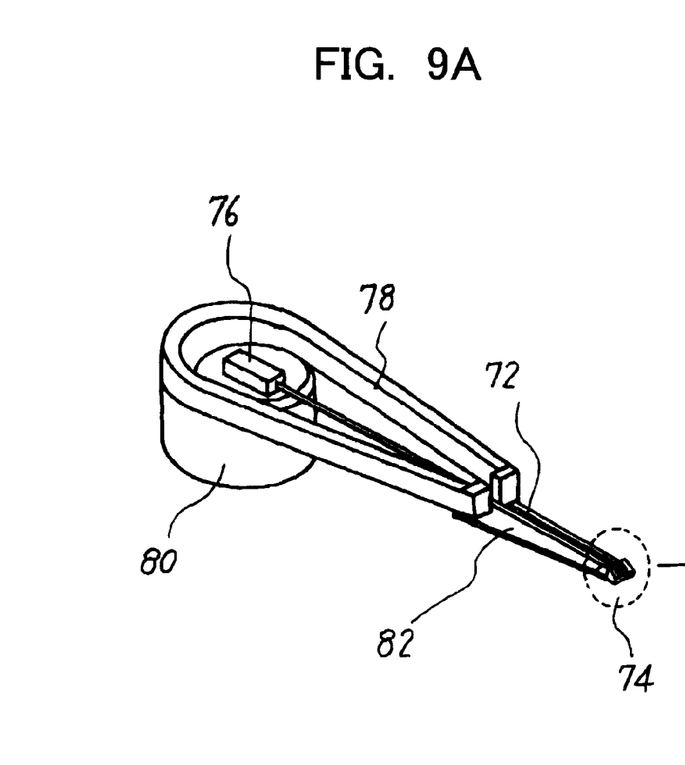
FIGS. 9A and 9B are perspective views showing a configuration of an optical head using a micro actuator.
Figure 9B:
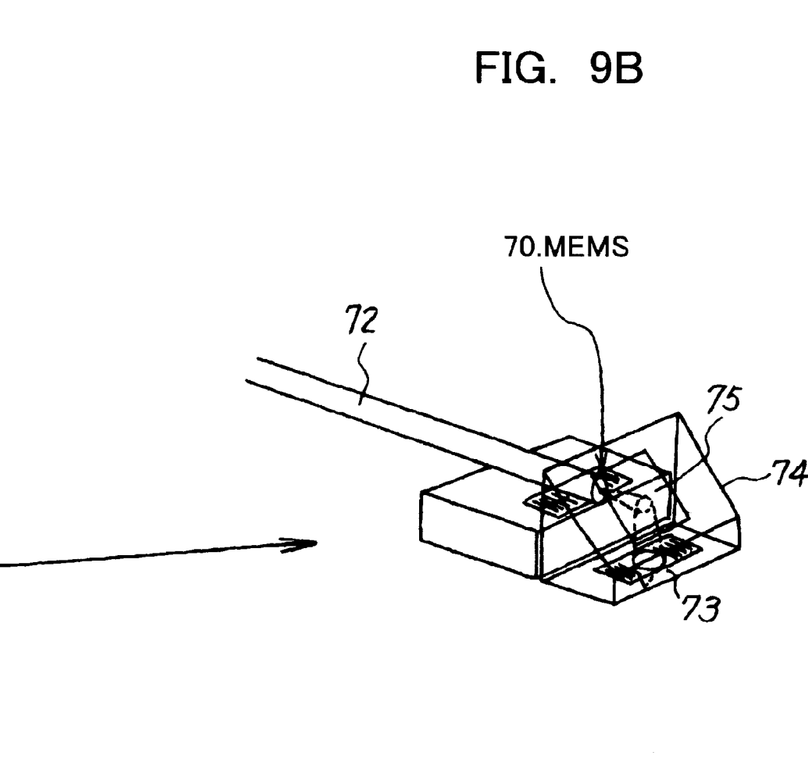

FIGS. 9A and 9B are perspective views showing a configuration of an optical head using the above micro actuator.

FIG. 9A is a perspective view of the entire optical head. A light-emitting/light-receiving part 76 is connected via an optical fiber 72 to a head 74 having a condenser lens not shown. The head 74 is attached to a terminal end of a ginbal 82 mounted on a head arm 78 which is laterally driven by a head actuator 80. At the terminal end of the ginbal 82, an end of the optical fiber 72 is placed on the self-adapting MEMS 70.

FIG. 9B is an enlarged view of the ginbal terminal end. The optical fiber 72 is placed on the self-adapting MEMS 70 so as to make optical axis alignment with a condenser lens 73 and a mirror 75 of the head 74.

Figure 10A:
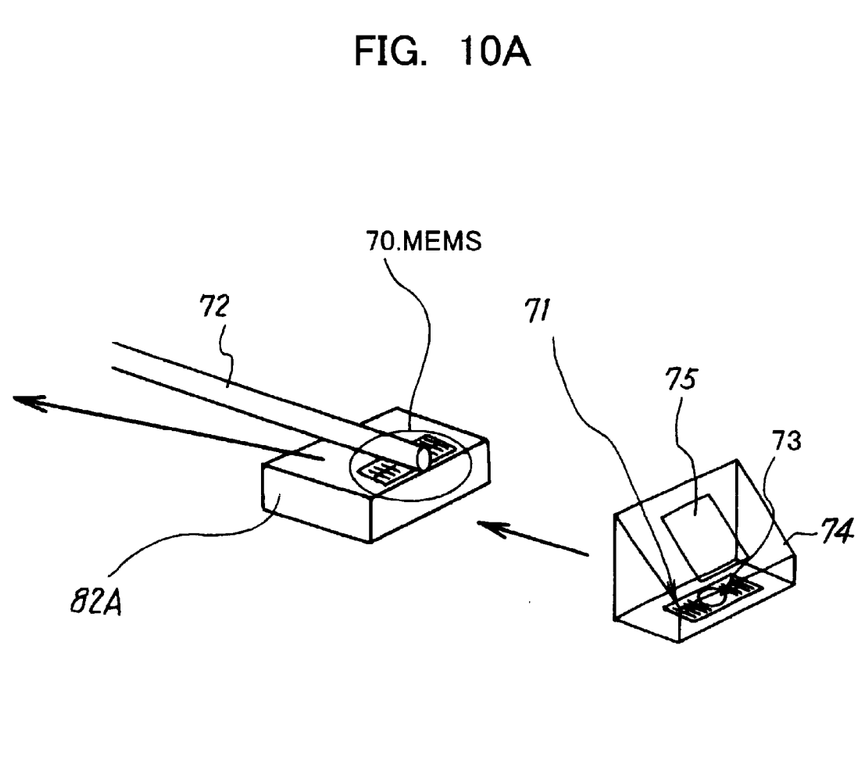
FIGS. 10A and 10B are perspective views showing another configuration of the optical head using the micro actuator.
Figure 10B:
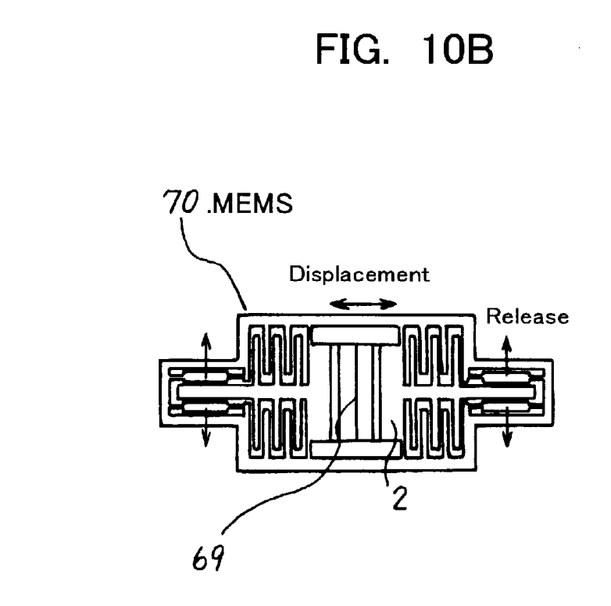

FIGS. 10A and 10B are also perspective views showing the configuration of the optical head using the above micro actuator. FIG. 10A shows the state in which the head 74 is attached to a terminal end 82A of the ginbal on which is mounted the self-adapting MEMS 70 mounted with the end of the optical fiber 72. The head 74 comprises the mirror 75 for vertically directing the optical axis of the optical fiber 72, and the condenser lens 73 for condensing lights onto a medium not shown. After attachment of the head 74 to the terminal end 82A of the ginbal with somewhat a loose accuracy, adjustment is made of the horizontal position of the displacement part 2 of the self-adapting MEMS 70 shown in FIG. 10B. Positional adjustment is then made of the optical fiber placed on a fiber placement portion 69 of the displacement part 2 in order to perform optical axis alignment with the optical fiber 72 and the condenser lens 73. A high-accuracy optical axis alignment thereby becomes possible.

In the above example of the optical head and the optical module, utilization of the micro actuator of this embodiment enables the optical axis alignment requiring a minute distance adjustment to be effected through the application of voltage in place of manual adjustment. This facilitates the minute distance adjustment easily. The micro actuator of this embodiment has extremely reduced dimensions. For this reason, it can be mounted on a lightweight head such as the optical head, which needs to be floated by rotations of the disk. It is thus possible to reduce the size itself and the weight of the optical head.

Application of this micro actuator to the optical communication module enables submicron accuracy optical axis alignment to be effected in a short period of time. This micro actuator can be mounted on a float-slider type micro optical head as well, to easily achieve a micron-accuracy optical axis alignment.

According to the present invention, as set forth herein above, there is provided a micro actuator capable of displacing the displacement part to any position and capable of keeping that position without any voltage applied. Utilization of the micro actuator makes the optical axis alignment in the optical communication module easy and such micro actuator can be used as an optical axis adjusting element of the micro optical head.

It will be appreciated that the scope of protection for the present invention is not limited to the above embodiments and that it covers the inventions defined in the appended claims and their equivalents.

What is claimed is:

1. A micro actuator displacing a micro portion by use of an electrostatic force, said micro actuator comprising:
   a first stationary part;
   a displacement part spaced apart from said first stationary part by a predetermined distance in a confronting manner, said displacement part associated with said first stationary part by way of a first support, said displacement part being displaceable relative to said first stationary part;
   a second stationary part; and
   lock parts spaced apart from said second stationary part by a predetermined distance in a confronting manner, said lock parts associated with said second stationary part by way of a second support, said lock parts being displaceable relative to said second stationary part; wherein
   said displacement part is displaced by application of a voltage between said first stationary part and said displacement part, said lock parts being displaced by application of a voltage between said second stationary part and said lock parts, and wherein
   said lock parts clamp said displacement part with no voltage applied, said lock parts releasing said displacement part with a voltage applied.

2. The micro actuator according to claim 1, further comprising:
   a third stationary part spaced apart from said displacement part by a predetermined distance in a confronting manner, said displacement part being displaced by application of a voltage between said third stationary part and said displacement part, wherein
   a first direction of displacement relative to said first stationary part is different from a second direction of displacement relative to said third stationary part.

3. The micro actuator according to claim 2, wherein said first direction of displacement is substantially orthogonal to said second direction of displacement.

4. An optical module apparatus comprising:
   a micro actuator according to any one of claims 1 to 3;
   a lens disposed on said displacement part; and
   a first and a second optical component disposed on both sides of said lens, said first and said second optical component consisting of any one of a light-emitting element, a light-receiving element, an optical waveguide and an optical fiber, wherein
   said lens is positioned so that optical axes of said first and said second optical component are coincident with each other.

5. An optical head for an optical disk unit or an magneto-optical disk unit, said optical head comprising:
   a micro actuator according to any one of claims 1 to 3,
   an optical fiber having a terminal end placed on said displacement part; and
   a head disposed at an end of said optical fiber, wherein said terminal end of said optical fiber is positioned so that the optical axis of the fiber aligns with said head.

* * * * *